Figure 3:
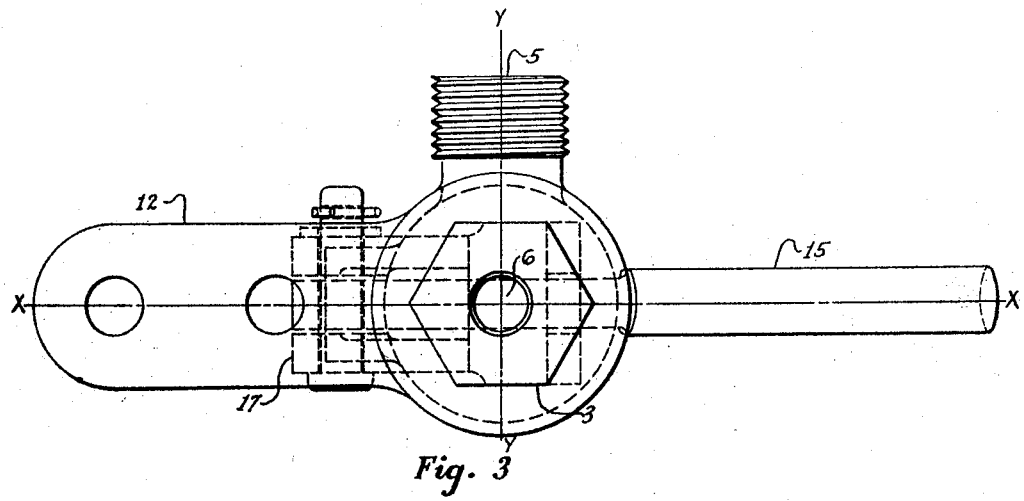

March 7, 1933.   H. W. CODDINGTON   1,900,379
CONTROL VALVE FOR LOW WATER ALARMS
Filed Feb. 13, 1932   3 Sheets-Sheet 1

INVENTOR.
HARRY W. CODDINGTON
BY
ATTORNEY.

March 7, 1933.   H. W. CODDINGTON   1,900,379
CONTROL VALVE FOR LOW WATER ALARMS
Filed Feb. 13, 1932    3 Sheets-Sheet 2

INVENTOR.
HARRY W. CODDINGTON
BY
ATTORNEY.

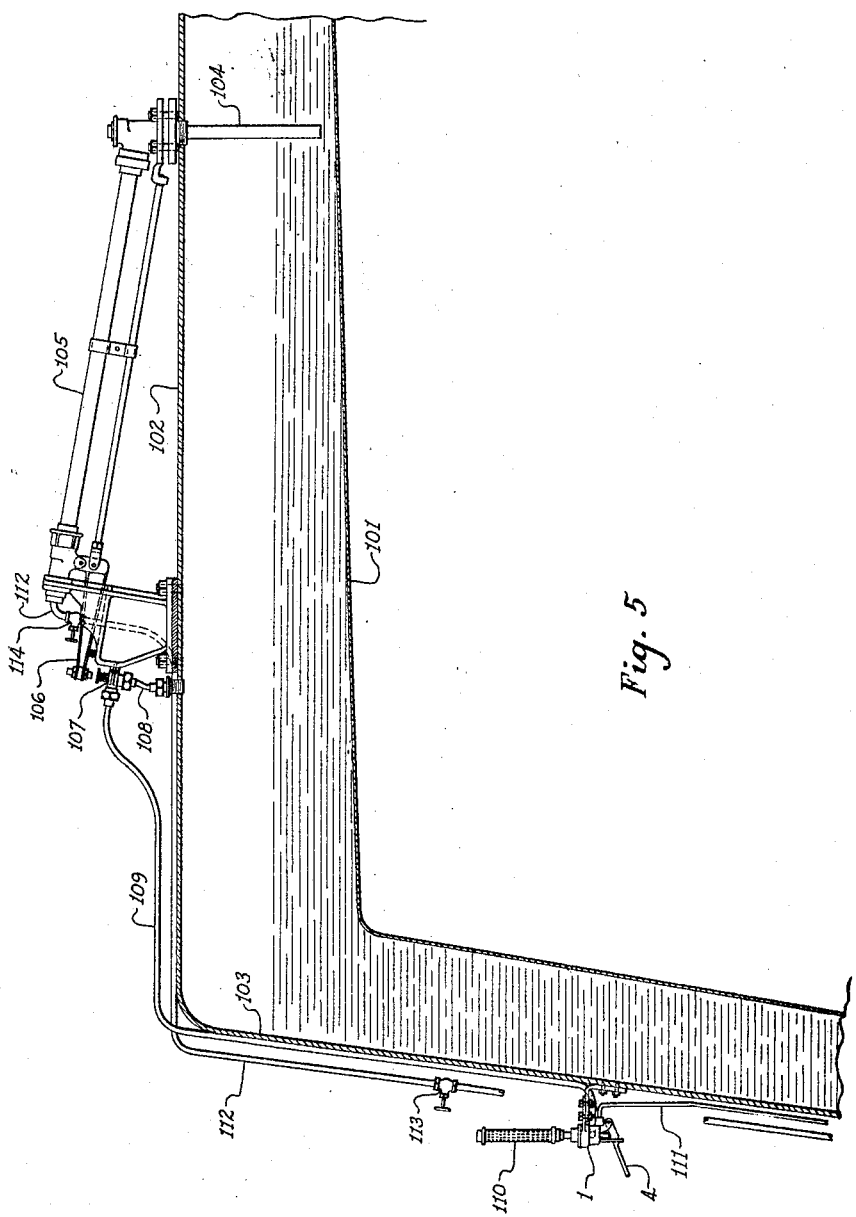

Patented Mar. 7, 1933

1,900,379

UNITED STATES PATENT OFFICE

HARRY W. CODDINGTON, OF ROANOKE, VIRGINIA

CONTROL VALVE FOR LOW WATER ALARMS

Application filed February 13, 1932. Serial No. 592,708.

This invention relates to low water alarms and is particularly adapted for locomotive boiler use, although it is also useful with steam boilers of other types. It has to do specifically with means for temporarily modulating or stopping the sound of the alarm whistle or other alarm element at times when such sounding is annoying or undesirable.

The principal object of the invention is to provide a valve mechanism in the whistle line whereby the sound of the whistle may be reduced when desired, without thereby jeopardizing the normal operation of the device and the full sounding of the alarm whistle at subsequent times of low water in the boiler.

Another object is to provide a whistle cutout valve which is operable or controlled by the locomotive attendant to cut off or diminish the flow of steam to the whistle and which will be self-restoring to fully open position as soon as the supply of steam is cut off at the alarm valve.

A further object is to provide a whistle control valve which may be closed by the attendant and which will be held closed by steam pressure attempting to flow through the same, and which will automatically return to open position as soon as the steam pressure falls off.

Another object is to provide a whistle control valve which will at all times remain in open position, except when deliberately closed by the attendant, and will then remain in closed position only if, and so long as, suitable pressure from steam or other fluid is present against the valve member.

A still further object is to provide a combined alarm element control valve and drain valve which will normally stand in position to admit the alarm fluid to the alarm element and at the same time permit the drainage of condensation to the atmosphere and the valve member of which may be manually moved to a position to shut off or diminish the flow of the alarm fluid to the alarm element without reducing or stopping off the drainage opening to the atmosphere.

With these and other objects in view the invention consists of the formation, combination and arrangement of parts as will be herein described and claimed.

The accompanying drawings show a preferred embodiment of the invention. As it is particularly intended for use on locomotive boilers the drawings show it applied to such a boiler in connection with a low water alarm of the thermostatic type. The detail operation of the particular low water alarm shown in these drawings may be learned by reference to the patents to Kadel et al., #1,127,010 and #1,181,316. It will be understood, however, that the present invention is equally adapted for use with other styles and types of low water alarms, and its use is not limited to alarms for locomotive boilers.

Figure 6:
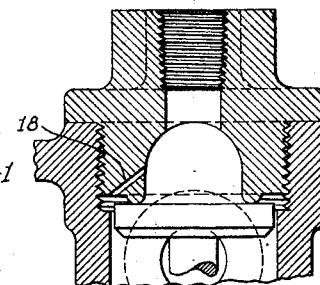
Figure 1:
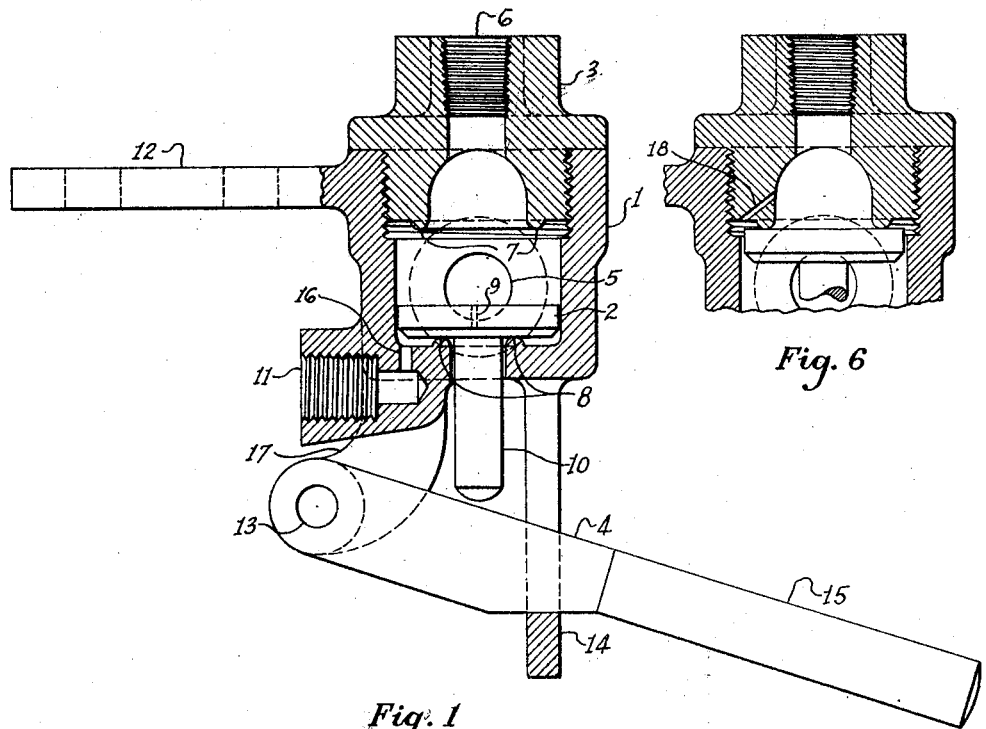
Figure 2:
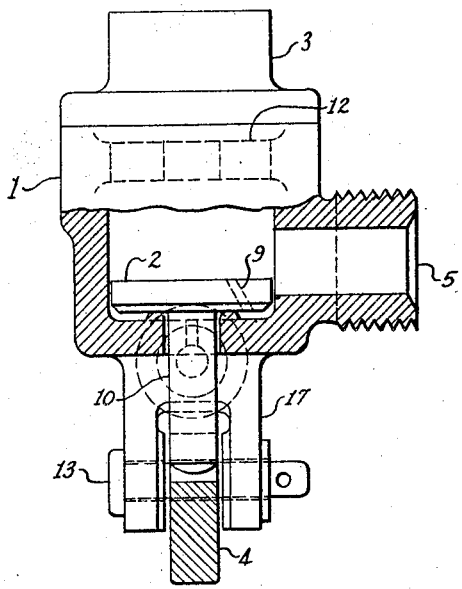
Figure 4:
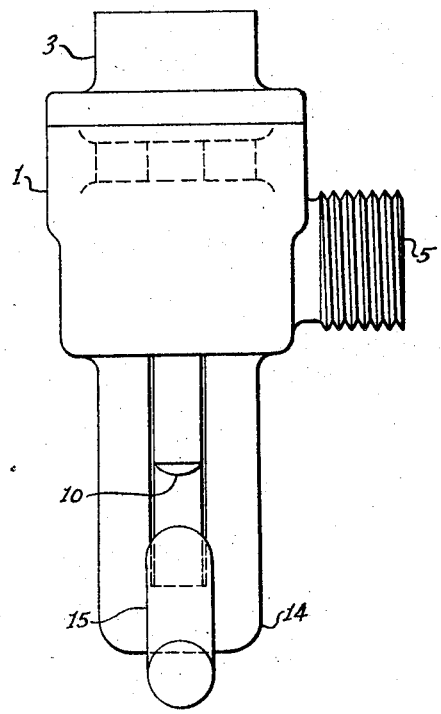

Referring to the drawings, which show a preferred embodiment of the invention, Figure 1 is a transverse vertical section through the valve, this view being taken substantially on the line x—x of Figure 3. Figure 2 is a partial transverse vertical section taken at right angles to Figure 1, and on the line y—y of Figure 3. Figure 3 is a plan view of the valve and Figure 4 an end elevation thereof. Figure 5 is a diagrammatic view showing a fragment of a boiler with a low water alarm mechanism thereon and with the present control valve in place in the whistle piping. Figure 6 is a fragmentary vertical sectional view similar to Figure 1, showing a slight modification of the construction of the valve.

As before stated, the particular alarm illustrated in these drawings is of the type shown in the patents to Kadel et al., the boiler crown sheet being indicated at 101, the shell at 102 and the backhead at 103. The drop pipe of the low water alarm is shown at 104, the expansion tube at 105, the actuating lever at 106 and the alarm valve at 107. 108 represents the steam connection from the boiler to the alarm valve and 109 the steam line from the alarm valve to the whistle 110. There are also shown the test pipe 112, test valve 113, and a shut-off cock 114. It will not be necessary to describe in detail the operation of the low water alarm; suffice it to say that at times of low water the valve 107 is opened and steam from the boiler is di- 16 and the leakage around the stem 10 are smaller in effect than the inlet 5, there will be abundant pressure in the cavity to hold the piston against the upper seat 7.

When the piston 2 is against the seat 7, the major portion of the steam that passes through the valve 107 when the latter is open will pass to the atmosphere. But a small portion thereof will pass through the opening 9 to the whistle, so that a soft sounding of the whistle will occur, thus indicating to the engineman that all of the parts are functioning properly after he has lifted the piston 2 by means of the lever 4. When the condition of low water no longer exists, the parts should be in their normal positions. The hole 9 may then constitute a telltale whereby the engineman may know whether or not the piston has dropped to its desired normal position. If it has dropped, then when a subsequent condition of low water occurs the whistle will sound at full volume. But, if for any reason, the piston failed to drop and remains in its upper position, then the subsequent low water condition will result merely in a subdued sounding of the whistle, possibly enough to attract the attention of the attendant and incite him to an investigation. At the same time, leakage at the valve 107 will not cause even a subdued sounding of the whistle when the piston 2 is in its upper position, inasmuch as the small amount of steam that results from leakage will, under such conditions, pass principally from the inlet 5 through the opening 16 and pipe 111 to the atmosphere, the opening 9 not being of sufficient size to direct enough of such steam to the whistle to cause even a subdued sounding thereof.

In Figure 6 is shown a slight modification of the valve, where a by-pass aperture 18 is provided around the valve seat 7. In this modification the hole 9 may be omitted from the piston 2, and the necessary piston clearance will be provided so that sufficient leakage of steam past the piston will take place to give the desired soft tone to the whistle when the piston is in raised position against the seat 7. This construction, in which the hole 9 is omitted, will result in less wastage of steam when the piston is in its normal or lowermost position and may be advantageously employed when it is not desired to utilize the size of the hole 9 to control or determine the normal tone of the whistle.

It will be noted that the valve seat 8 comprises, with the bottom of the piston 2, means for shutting off the leakage of steam around the valve stem 10 when the piston is held by steam pressure in its normal or lowermost position. This is desirable to prevent leakage of steam in the locomotive cab when the alarm is sounding, all steam and condensate passing at such times to the ash pan through the pipe 111.

There has thus been described a preferred embodiment of the invention. Other embodiments are contemplated within the scope of the appended claims without departing from the spirit thereof.

What is claimed is:

1. A fluid-pressure control valve for low water alarms, including a body having an inlet opening for admitting fluid pressure from the alarm valve and an outlet opening adapted for fluid connection with the alarm element, and valve means inside said body, said valve means being arranged to lie normally in a position to permit free passage of pressure fluid from the alarm valve to the alarm element through said control valve and to be held in said position by the presence of fluid pressure inside the body thereof, and an orifice of reduced size around said valve means whereby a small predetermined amount of fluid may escape past said valve means to the atmosphere when said valve means is in the first mentioned position.

2. A fluid-pressure control valve for low water alarms including a body having an inlet opening for admitting fluid pressure from the alarm valve and an outlet opening adapted for fluid connection with the alarm element, and valve means inside said body, said valve means being arranged to lie normally in a position to permit free and unrestricted passage of pressure fluid from the alarm valve to the alarm element through said control valve and to be held in said position by the presence of fluid pressure inside the body thereof, said valve means being arranged to be manually moved to a second position to cut off the passage of pressure fluid to the alarm element, and an orifice of reduced size through said valve means whereby a small but greatly diminished supply of pressure fluid will be directed to the alarm element when the valve means is in the said second mentioned position.

3. A fluid-pressure control valve for low water alarms adapted for insertion in the fluid pressure conduit between the alarm valve and the alarm element, said control valve having an inlet and two outlet openings, one of the latter leading to the alarm element and the other thereof to the atmosphere, said control valve including valve means arranged so that pressure fluid passing into said control valve from the alarm valve will at all times be directed through both of said outlet openings, said valve means being arranged to be actuated to change the proportions of the fluid that is directed through the respective outlet openings.

4. A fluid-pressure control valve for low water alarms adapted for insertion in the fluid pressure conduit between the alarm valve and the alarm element, said control valve having an inlet and two outlet openings, one of the latter leading to the alarm element and the other thereof to the atmosphere, said control valve including valve means arranged so that pressure fluid passing into said control valve from the alarm valve will at all times be directed through both of said outlet openings, said valve means being arranged to lie normally in position to direct the major portion of the pressure fluid to the alarm element.

5. A fluid-pressure control valve for low water alarms adapted for insertion in the fluid-pressure conduit between the alarm valve and the alarm element, said control valve having an inlet and two outlet openings, one of the latter leading to the alarm element and the other thereof to the atmosphere, said control valve including valve means arranged so that pressure fluid passing into said control valve from the alarm valve will at all times be directed through both of said outlet openings, said valve means being arranged to lie normally in position to direct the major portion of the pressure fluid to the alarm element, and to be moved manually into a position where a minor portion of the pressure fluid is directed to the alarm element.

6. A fluid-pressure control valve for low water alarms adapted for insertion in the fluid pressure conduit between the alarm valve and the alarm element, said control valve having an inlet and two outlet openings, one of the latter leading to the alarm element and the other thereof to the atmosphere, said control valve including valve means arranged so that pressure fluid passing into said control valve from the alarm valve will at all times be directed through both of said outlet openings, said valve means being arranged to lie normally in position to direct the major portion of the pressure fluid to the alarm element, and to be moved manually into a position where a minor portion of the pressure fluid is directed to the alarm element and to be held in such position by the fluid pressure and to return automatically to the first mentioned normal position when the supply of fluid pressure falls off.

7. A fluid-pressure control valve for low water alarms adapted for insertion in the fluid passageway between the alarm valve and the alarm element, said valve embodying a hollow body with an inlet and two discharge openings, one of the latter being arranged for fluid connection with the alarm element and the other thereof leading to the atmosphere, a piston arranged across the cavity of the said body, said piston being arranged between said discharge openings and adapted to occupy a position at either end of said cavity and to be held in said respective positions by pressure from said inlet opening, said piston when in one position comprising valve means for partly closing off the flow of fluid pressure to the alarm element.

8. A fluid-pressure control valve for low water alarms adapted for insertion in the fluid passageway between the alarm valve and the alarm element, said valve embodying a hollow body with an inlet and two discharge openings, one of the latter being arranged for fluid connection with the alarm element and the other thereof leading to the atmosphere, a piston arranged across the cavity of the said body, said piston being arranged between said discharge openings and adapted to occupy a position at either end of said cavity and to be held in said respective positions by pressure from said inlet opening, said piston when in one position comprising valve means for partly closing off the flow of fluid pressure to the alarm element and when in the other to the atmosphere, being adapted to normally occupy the last mentioned position, and to automatically return thereto with falling off of pressure inside the valve body, and being movable manually into the first mentioned position.

9. A fluid-pressure control valve for low water alarms adapted for insertion in the fluid passageway between the alarm valve and the alarm element, said valve embodying a hollow body with an inlet and two discharge openings, one of the latter being arranged for fluid connection with the alarm element and the other thereof leading to the atmosphere, a piston arranged across the cavity of the said body, said piston being arranged between said discharge openings and adapted to occupy a position at either end of said cavity and to be held in said respective positions by pressure from said inlet opening, said piston being provided with means external of the body of the control valve whereby it may be manually shifted into one of said positions where the flow of fluid to the alarm element will be restricted and at the same time the discharge to the atmosphere through the other discharge opening not decreased.

In testimony whereof I affix my signature.

HARRY W. CODDINGTON.